United States Patent
Morita

(10) Patent No.: US 7,590,409 B2
(45) Date of Patent: Sep. 15, 2009

(54) COMMUNICATIONS SYSTEM, COMMUNICATIONS APPARATUS, AND COMMUNICATION METHOD

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 597 days.

(21) Appl. No.: 11/361,444

(22) Filed: Feb. 24, 2006

(65) Prior Publication Data

US 2006/0240776 A1  Oct. 26, 2006

(30) Foreign Application Priority Data

Feb. 25, 2005  (JP) .......................... P2005-050660

(51) Int. Cl.
*H04M 1/66*  (2006.01)
*H04M 1/68*  (2006.01)
*H04M 3/16*  (2006.01)

(52) U.S. Cl. ...................... 455/411; 455/410; 455/41.2; 455/26.1; 455/68; 455/69; 455/552.1; 455/553.1; 705/64; 705/67; 705/71; 713/168; 713/169; 713/170; 713/171; 380/44; 380/270; 380/283

(58) Field of Classification Search ......... 455/405–411, 455/418–420, 41.1–2, 26.1, 68–69, 550.1, 455/552.1, 553.1, 556.1–2, 557–558, 90.1; 705/64–79; 713/184–185, 168–181; 380/44, 380/270, 283

See application file for complete search history.

(56) References Cited

U.S. PATENT DOCUMENTS 6,829,467 B2 * 12/2004 Ochiai ....................... 455/41.2
6,934,689 B1 * 8/2005 Ritter et al. ................... 705/17
7,016,666 B2 * 3/2006 Lauper et al. ............... 455/411
7,341,180 B2 * 3/2008 Uehara ........................ 235/380
7,412,229 B2 * 8/2008 Ochiai et al. ................ 455/410

FOREIGN PATENT DOCUMENTS

JP  2001175751  6/2001
JP  2002183443  6/2002

* cited by examiner

*Primary Examiner*—Tuan A Tran
(74) *Attorney, Agent, or Firm*—K&L Gates LLP

(57) ABSTRACT

A communication system, a communication apparatus, and a communication method are provided. A communications apparatus includes a generation unit for generating a transmission message sent to a different communications apparatus and effective for only one transmission, a first communications units for communicating with the different communications apparatus using Near Field Communication, a second communications unit for communicating with the different communications apparatus via a predetermined communication channel, and a control unit for controlling the communication functions. The second communications unit transmits the transmission message generated by the generation unit and receives a different transmission message transmitted from the different communications apparatus via the predetermined communication channel. The first communications unit receives a message transmitted from the different communications apparatus and transmits the different transmission message to the different communications apparatus using Near Field Communication. The control unit determines whether the message received by the first communications unit is equal to the transmission message transmitted by the second communications unit.

9 Claims, 6 Drawing Sheets

COMMUNICATIONS SYSTEM, COMMUNICATIONS APPARATUS, AND COMMUNICATION METHOD

CROSS REFERENCES TO RELATED APPLICATIONS

The present application claims priority to Japanese Patent Application JP 2005-050660 filed in the Japanese Patent Office on Feb. 25, 2005, the entire contents of which is incorporated herein by reference.

BACKGROUND

The present invention relates to a communications system, a communications apparatus, and a communication method and, in particular, to a communications system, a communications apparatus, and a communication method that solve a problem caused by storing critical information on a card.

A system that allows a user to purchase goods using a credit card, a debit card, or a card having an electronic money capability is one of settlement systems that trade (settle) an electronic value having the same value as money (hereinafter also simply referred to as a value).

In a card settlement system, a user (customer) carries a card on a daily basis. When trading the value, in some system, a terminal installed in a store reads data stored on the user's card. The readout data is transmitted to a card provider via a network dedicated to the card provider to trade the value. In another system, card information input from a terminal, such as user's cell phone or a personal computer, is transmitted to a card provider via a public network including the Internet to trade the value (refer to, for example, Japanese Unexamined Patent Application Publication No. 2002-183443 and Japanese Unexamined Patent Application Publication No. 2001-175751).

Accordingly, the card contains critical information including information such as a private key for identifying (authenticating) the card (i.e., the user who holds the card) and information about a value that the user currently holds. The card provider verifies the authenticity of the card from the critical information stored on the card and information input by the user, and subsequently, carries out transfer of the value (i.e., settlement).

However, since critical information is stored on a card and the card is carried by a user, there is a possibility that the user could lose the card and the critical information stored on the card leaks. Also, there is a possibility that the critical information stored on the card could be skimmed.

SUMMARY

Accordingly, there are provided a communications system, a communications apparatus, and a communication method that solve a problem caused by storing critical information on a card.

According to an embodiment of the present invention, a communications system includes a first communications apparatus, and a second communications apparatus for communicating with the first communications apparatus. The first communications apparatus includes generation means for generating a transmission message to be sent to the second communications apparatus and effective for only one transmission, first communications means for directly communicating with the second communications apparatus using Near Field Communication, second communications means for indirectly communicating with the second communications apparatus via a predetermined communication channel, and control means for controlling communication functions of the first and second communications means. The second communications means transmits the transmission message generated by the generation means to the second communications apparatus via the predetermined communication channel and receives a different transmission message transmitted from the second communications apparatus via the predetermined communication channel, the first communication means receives a communication message transmitted from the second communications apparatus using Near Field Communication and transmits the different transmission message received by the second communication means to the second communications apparatus using Near Field Communication, and the control means determines whether the communication message received by the first communications means is equal to the transmission message transmitted by the second communications means.

According to another embodiment of the present invention, a communications apparatus for communicating with a different communications apparatus includes generation means for generating a transmission message to be sent to the different communications apparatus and effective for only one transmission, first communications means for directly communicating with the different communications apparatus using Near Field Communication, second communications means for indirectly communicating with the different communications apparatus via a predetermined communication channel, and control means for controlling communication functions of the first and second communications means. The second communications means transmits the transmission message generated by the generation means to the different communications apparatus via the predetermined communication channel and receives a different transmission message transmitted from the different communications apparatus via the predetermined communication channel, the first communication means receives a communication message transmitted from the different communications apparatus using Near Field Communication and transmits the different transmission message received by the second communication means to the different communications apparatus using Near Field Communication, and the control means determines whether the communication message received by the first communications means is equal to the transmission message transmitted by the second communications means.

The second communications means can indirectly communicate with the different communications apparatus by transmitting and receiving the transmission message and the different transmission message in the form of an e-mail.

First and second mail servers can transfer a received mail to a specified destination, the communications apparatus can access the first mail server via the predetermined communication channel, and the different communications apparatus can access the second mail server via the predetermined communication channel. The first communication means can further receive apparatus identification information for identifying the different communications apparatus and server identification information for identifying the second mail server transmitted from the different communications apparatus using Near Field Communication, and the second communications means can transmit the transmission message to the different communications apparatus by transmitting the transmission message to the first mail server in the form of an e-mail including the server identification information and the apparatus identification information.

The generation means can generate a random number as the transmission message.

The communications apparatus can include a mobile communications apparatus.

According to still another embodiment of the present invention, a communications method for use in a communications apparatus for communicating with a different communications apparatus is provided. The communications apparatus includes generation means for generating a transmission message to be sent to the different communications apparatus and effective for only one transmission, first communications means for directly communicating with the different communications apparatus using Near Field Communication, second communications means for indirectly communicating with the different communications apparatus via a predetermined communication channel, and control means for controlling communication functions of the first and second communications means. The method includes the steps of transmitting, in the second communications means, the transmission message generated by the generation means to the different communications apparatus via the predetermined communication channel and receiving a different transmission message transmitted from the different communications apparatus via the predetermined communication channel, receiving, in the first communication means, a communication message transmitted from the different communications apparatus using Near Field Communication and transmitting the different transmission message received by the second communication means to the different communications apparatus using Near Field Communication, and determining, in the control means, whether the communication message received by the first communications means is equal to the transmission message transmitted by the second communications means.

According to the embodiments of the present invention, in the second communications means, a transmission message generated by the generation means is transmitted to the different communications apparatus via the predetermined communication channel and a different transmission message transmitted from the different communications apparatus via the predetermined communication channel is received. Additionally, in the first communication means, a communication message transmitted from the different communications apparatus is received using Near Field Communication and the different transmission message received by the second communication means is transmitted to the different communications apparatus using Near Field Communication. Furthermore, the control means determines whether the communication message received by the first communications means is equal to the transmission message transmitted by the second communications means.

According to the embodiments of the present invention, the problems caused by storing critical information in a card can be solved.

Additional features and advantages are described herein, and will be apparent from, the following Detailed Description and the figures.

DETAILED DESCRIPTION

Figure 2:
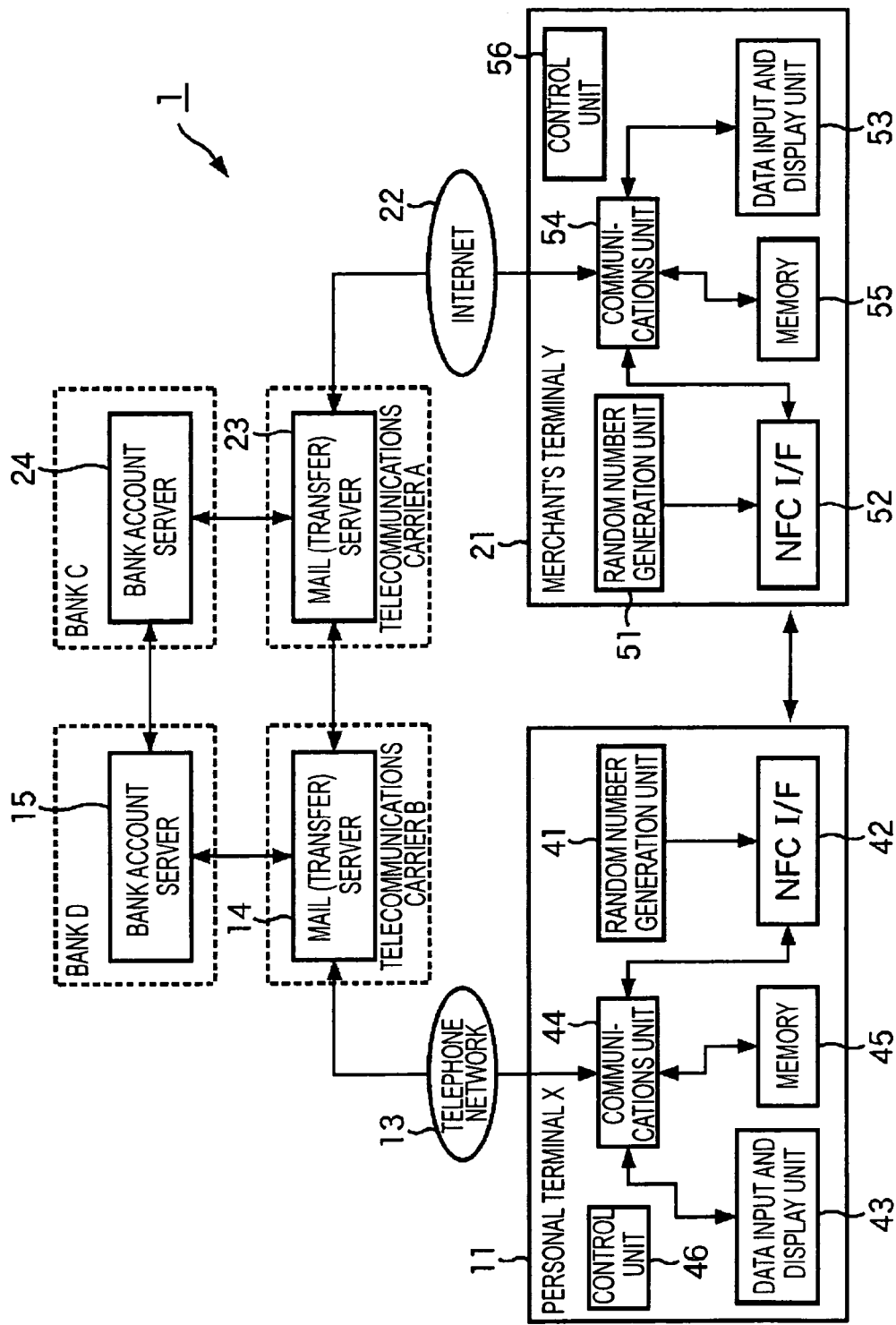
FIG. 2 is a block diagram of the communication system shown in FIG. 1.

According to an embodiment of the present invention, a communication system (e.g., a communications system 1 shown in FIG. 2) includes a first communication apparatus (e.g., a personal terminal 11 shown in FIG. 2) and a second communication apparatus for communicating with the first communication apparatus (e.g., a merchant's terminal 21 shown in FIG. 2). The first communication apparatus includes generation means (e.g., the random number generation unit 41 shown in FIG. 2) for generating a transmission message to be sent to the second communications apparatus and effective for only one transmission, first communications means (e.g., the NFC I/F 42 shown in FIG. 2) for directly communicating with the second communications apparatus using Near Field Communication, second communications means (e.g., the communications unit 44 shown in FIG. 2) for indirectly communicating with the second communications apparatus via a predetermined communication channel, and control means (e.g., the control unit 46 shown in FIG. 2) for controlling communication functions of the first and second communications means. The second communications means transmits the transmission message generated by the generation means to the second communications apparatus via the predetermined communication channel and receives a different transmission message transmitted from the second communications apparatus via the predetermined communication channel, the first communication means receives a communication message transmitted from the second communications apparatus using Near Field Communication and transmits the different transmission message received by the second communication means to the second communications apparatus using Near Field Communication, and the control means determines whether the communication message received by the first communications means is equal to the transmission message transmitted by the second communications means.

According to another embodiment of the present invention, a communications method for use in a communications apparatus (e.g., the personal terminal 11 shown in FIG. 2) for communicating with a different communications apparatus (e.g., the merchant's terminal 21 shown in FIG. 21) is provided. The communications apparatus includes generation means (e.g., the random number generation unit 41 shown in FIG. 2) for generating a transmission message to be sent to the different communications apparatus and effective for only one transmission, first communications means (e.g., the NFC I/F 42 shown in FIG. 2) for directly communicating with the different communications apparatus using Near Field Communication, second communications means (e.g., the communications unit 44 shown in FIG. 2) for indirectly communicating with the different communications apparatus via a predetermined communication channel, and control means (e.g., the control unit 46 shown in FIG. 2) for controlling communication functions of the first and second communications means. The method includes the steps of transmitting, in the second communications means, the transmission message generated by the generation means to the different communications apparatus via the predetermined communication channel (e.g., the process at step S105 shown in FIG. 3) and receiving a different transmission message transmitted from the different communications apparatus via the predetermined communication channel (e.g., the process at step S106 shown in FIG. 3), receiving, in the first communication means, a communication message transmitted from the different communications apparatus using Near Field Communication (e.g., the process at step S108 shown in FIG. 3) and transmitting the different transmission message received by the second communication means to the different communications apparatus using Near Field Communication (e.g., the process at step S107 shown in FIG. 3), and determining, in the control means, whether the communication message received by the first communications means is equal to the transmission message transmitted by the second communications means (e.g., the process at step S109 shown in FIG. 3).

Exemplary embodiments of the present invention are now herein described with reference to the accompanying drawings.

Figure 1:
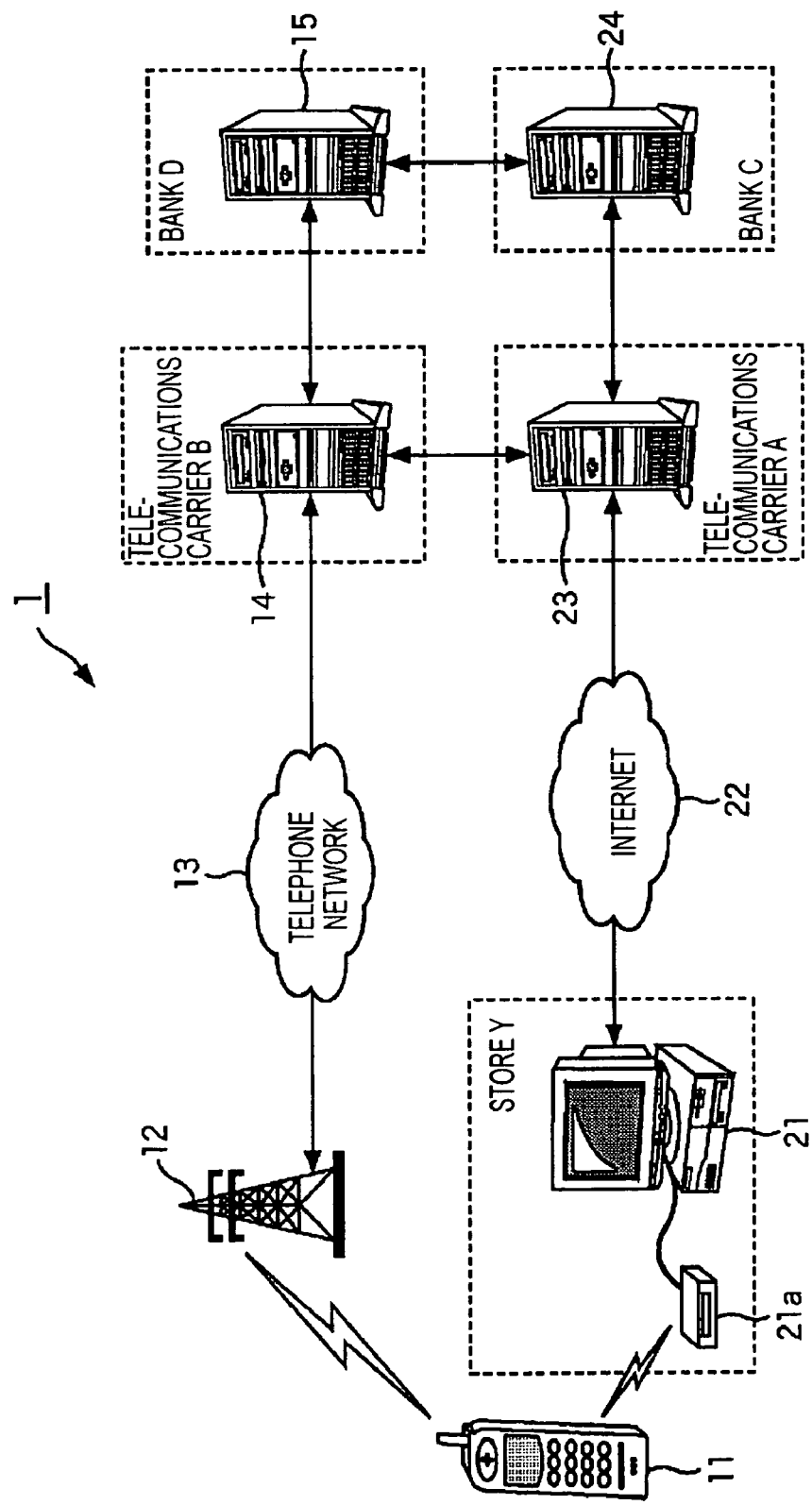
FIG. 1 illustrates an example of the configuration of a communication system according to an embodiment of the present invention.

FIG. 1 is a block diagram of a communications system according to an embodiment of the present invention. As used herein, the term "system" refers to a logical combination of a plurality of apparatuses regardless of whether all the apparatuses are incorporated in one casing or not.

As shown in FIG. 1, a communications system 1 is a system that provides a credit settlement service for settling a value using an e-mail service (short message service (SMS)).

As used herein, the term "credit settlement service" refers to a service in which, for example, a user (customer) who purchases goods and a store which sells the goods check their credibility (authenticity) with each other, and subsequently, a settlement of the purchase is made by using a value. Accordingly, the user can purchase the goods by exchanging a value with the goods within the range of the value loaded (charged) in advance. In this embodiment, the value is represented in the form of electronic money.

A personal terminal (mobile communications apparatus) 11 (e.g., cell phone or personal digital assistant (PDA)) of a user (customer) X can access a mail (transfer) server 14 provided by a telecommunications carrier B to which the user X has subscribed via a base station 12 and a telephone network 13, and can perform communication (transmission and reception of an e-mail).

The telecommunications carrier B provides a mail (short message) service to the subscribers. That is, the mail server 14 (hereinafter also referred to as a "telecommunications carrier-B server 14") transmits (transfers) a mail (short message) received from a terminal of a user who has subscribed to the telecommunications carrier B to a specified destination.

The user X has made an agreement of a mail transfer service with the telecommunications carrier B. The user X has also made an agreement with a bank D to notify the user X of an available balance in an electronic money account of the user X and to carry out electronic fund transfer of a certain amount of money in response to a request (instruction message) from the user X by e-mail.

Accordingly, for example, upon receiving, from the personal terminal 11, a mail requesting a fund transfer of a certain amount of electronic money, the mail server 14 of the telecommunications carrier B transmits a mail (i.e., instruction message) to a bank account server 15 (hereinafter also referred to as a "bank account-D server 15") to instruct a fund transfer of the certain amount of money.

Additionally, for example, when the mail server 14 of the telecommunications carrier B receives, from the personal terminal 11, a mail to be transferred to a merchant's terminal 21 of a store Y which is a subscriber of another telecommunications carrier A, the mail server 14 transmits (transfers) this received mail to a mail server 23 of the telecommunications carrier A. Furthermore, when the mail server 14 receives a mail to be transferred to the personal terminal 11 from the mail server 23 of the telecommunications carrier A, the mail server 14 transmits (transfers) this received mail to the personal terminal 11.

The telecommunications carrier B provides its subscriber (the personal terminal 11 of the user X) with a unique identification (ID) number or a communication connection number for identifying the subscriber, and an ID for identifying the telecommunications carrier B. In this embodiment, the telecommunications carrier B provides the user X with a personal terminal ID as an ID for identifying the user X and a telecommunications carrier $ID_B$ as an ID for identifying the telecommunications carrier B.

Additionally, the mail server 14 of the telecommunications carrier B stores the personal terminal ID provided to the user X by the telecommunications carrier B, a mail address of the user X, and information about a bank account of the user X in the bank D. The personal terminal ID has a one-to-one correspondence to the mail address and the information about the bank account.

The bank account server 15 of the bank D executes checking of the balance in the account and fund transfer of a predetermined amount in response to a request from the mail server 14 of the telecommunications carrier B by e-mail.

For example, when the bank account server 15 of the bank D receives a mail that instructs the bank account server 15 to check a balance in the account of the user X from the mail server 14 of the telecommunications carrier B, the bank account server 15 transmits (returns) the balance in the account of the user X to the mail server 14.

Additionally, for example, when the bank account server 15 of the bank D receives a mail that instructs to transfer a specified amount of money to an account of the store Y in a bank C, which is described below, from the mail server 14 of the telecommunications carrier B, the bank account server 15 transfers that specified amount of money to a bank account server 24 of the bank C.

The personal terminal 11 can operate in Near Field Communication (NFC) and can communicate with another NFC communications apparatus (e.g., NFC communications apparatus 21a) using carrier waves of a single frequency and electromagnetic induction.

Here, the personal terminal 11 and the NFC communications apparatus 21a can use, for example, a frequency of 13.56 MHz in the ISM (Industrial Scientific Medical) band as a frequency of the carrier waves.

The term "Near Field Communication" refers to a communication between communications apparatuses located within a distance of a few tens of centimeters including a communication when the bodies of the communications apparatuses are in contact with each other.

The user X can replenish the electronic money at the store Y having the NFC communications apparatus 21a by paying cash. In addition, the user X can purchase goods at the store Y using electronic money.

In this case, the personal terminal 11 communicates data for the trade of electronic money with the NFC communications apparatus 21a connected to the merchant's terminal 21 using Near Field Communication.

The merchant's terminal 21 installed in the store Y transmits the data received by the NFC communications apparatus 21a to the mail (transfer) server 23 of the telecommunications carrier A to which the store Y has subscribed.

The telecommunications carrier A provides a subscriber with a mail (short message) service. That is, the mail server 23 (hereinafter also referred to as a "telecommunications carrier-A server 23") of the telecommunications carrier A transmits (transfers) a mail (short message) received from a terminal of a user who has subscribed to the telecommunications carrier A to a specified destination.

The store Y has made an agreement of a mail transfer service with the telecommunications carrier A. The store Y has also made an agreement with the bank C to notify the store Y of an available cash balance in an account of the store Y and to pay a certain amount of money by electronic fund transfer in response to a request from store Y by e-mail.

Like the telecommunications carrier B, the telecommunications carrier A provides its subscriber (the merchant's terminal 21 of the store Y) with a unique identification (ID) number or a communication connection number for identifying the subscriber, and an ID for identifying the telecommunications carrier A. Here, the telecommunications carrier A provides the store Y with a merchant's terminal ID as an ID for identifying the store Y and a telecommunications carrier $ID_A$ as an ID for identifying the telecommunications carrier A.

Additionally, the mail server 23 of the telecommunications carrier A stores the merchant's terminal ID provided to the store Y by the telecommunications carrier A, a mail address of the store Y, and information about a bank account of the store Y in the bank C. The merchant's terminal ID has a one-to-one correspondence to the mail address and the information about the bank account.

Like the bank account server 15 of the bank D, the bank account server 24 (hereinafter also referred to as a "bank account-C server 24") of the bank C executes checking of a cash balance in the account and fund transfer of a predetermined amount in response to a request from the mail server 23 of the telecommunications carrier A by e-mail.

FIG. 2 is a block diagram of the communications system 1 shown in FIG. 1, which includes detailed block diagrams of the personal terminal 11 and the merchant's terminal 21. In FIG. 2, identical elements to those illustrated and described in relation to FIG. 1 are designated by identical reference numerals, and therefore, descriptions are not repeated.

The personal terminal 11 of the user X includes a random number generation unit 41, an NFC interface (I/F) 42, a data input and display unit 43, a communications unit 44, a memory 45, and a control unit 46.

The random number generation unit 41 generates a predetermined random number $R_x$ as needed and delivers it to the NFC I/F 42.

The NFC I/F 42 directly communicates data with an NFC I/F 52 of the merchant's terminal 21 using Near Field Communication.

The NFC I/F 42, for example, transmits the following information to the NFC I/F 52: a personal terminal ID for identifying the personal terminal 11 of the user X and a telecommunications carrier $ID_B$ for identifying the mail server 14 of the telecommunications carrier B to be accessed by the personal terminal 11. In contrast, the NFC I/F 42, for example, receives the following information from the NFC I/F 52: a merchant's terminal ID for identifying the merchant's terminal 21 of the store Y and a telecommunications carrier $ID_A$ for identifying the mail server 23 of the telecommunications carrier A to be accessed by the merchant's terminal 21.

From the viewpoint of the personal terminal 11, the merchant's terminal 21 is an external terminal which the personal terminal 11 accesses using Near Field Communication. From the viewpoint of the merchant's terminal 21, the personal terminal 11 is an external terminal which the merchant's terminal 21 accesses using Near Field Communication. Accordingly, the personal terminal ID for identifying the personal terminal 11 and the merchant's terminal ID for identifying the merchant's terminal 21 are information about external terminals for identifying the other sides of the communication for the merchant's terminal 21 and the personal terminal 11.

Furthermore, the NFC I/F 42 delivers a random number $R_x$ generated by the random number generation unit 41 to the communications unit 44 together with the merchant's terminal ID and the telecommunications carrier $ID_A$ received from the NFC I/F 52 of the merchant's terminal 21.

The data input and display unit 43 includes, for example, an input unit having numeric keys, character keys, a keyboard, a mouse, and a touch panel, and a display unit having a liquid crystal display (LCD). The data input and display unit 43 receives an instruction message from the user X and displays data delivered from the communications unit 44.

Additionally, the data input and display unit 43 delivers the instruction message received from the user X to the communications unit 44.

In this embodiment, examples of the instruction message include a fund transfer instruction of a purchased amount M' for purchasing goods, while examples of the data delivered from the communications unit 44 include a replenished amount M of electronic money.

The communications unit 44 transmits data delivered from the NFC I/F 42 or the data input and display unit 43 (e.g., the random number $R_X$ and the instruction message) to the telecommunications carrier-B server 14 in the form of an e-mail via the telephone network 13 or the like. Additionally, the communications unit 44 delivers mail data received from the telecommunications carrier-B server 14 to the NFC I/F 42 or the data input and display unit 43.

The memory 45 stores the communication data between the communications unit 44 and the telecommunications carrier-B server 14 for a predetermined period of time. The memory 45 also stores the personal terminal ID and the telecommunications carrier $ID_B$ provided by the telecommunications carrier B.

The control unit 46 includes, for example, a central processing unit (CPU). The control unit 46 controls components of the personal terminal 11. For example, the control unit 46 controls the communication functions of the NFC I/F 42 or the communications unit 44.

The merchant's terminal 21 of the store Y includes a random number generation unit 51, the NFC I/F 52, a data input and display unit 53, a communications unit 54, a memory 55, and a control unit 56. It is noted that the NFC communications apparatus 21a connected to the merchant's terminal 21 shown in FIG. 1 corresponds to the NFC I/F 52 shown in FIG. 2.

The random number generation unit 51 generates a predetermined random number $R_y$ as needed and delivers it to the NFC I/F 52.

The NFC I/F 52 directly communicates data with the NFC I/F 42 of the personal terminal 11 using Near Field Communication.

As described above, the NFC I/F 52, for example, transmits the following information to the NFC I/F 42: a merchant's terminal ID for identifying the merchant's terminal 21 of the store Y and a telecommunications carrier $ID_A$ for identifying the mail server 23 of the telecommunications carrier A to be accessed by the merchant's terminal 21. In contrast, the NFC I/F 52, for example, receives the following information from the NFC I/F 42: a personal terminal ID for identifying the personal terminal 11 of the user X and a telecommunications carrier $ID_B$ for identifying the mail server 14 of the telecommunications carrier B to be accessed by the personal terminal 11.

Furthermore, the NFC I/F 52 delivers a random number $R_Y$ generated by the random number generation unit 51 to the communications unit 54 together with the personal terminal ID and the telecommunications carrier $ID_B$ received from the NFC I/F 42 of the personal terminal 11.

The data input and display unit 53 includes an input unit having numeric keys, character keys, a keyboard, a mouse, and a touch panel, and a display unit having a liquid crystal display (LCD). The data input and display unit 43 receives an instruction message from a store personnel operating the merchant's terminal 21 in the store Y and displays data delivered from the communications unit 54.

The data input and display unit 53 also delivers an instruction message input by the store personnel to the communications unit 54.

In this embodiment, examples of the instruction message include a fund transfer instruction to transfer an amount M of electronic money to be replenished, while examples of the data delivered from the communications unit 54 include a purchased amount M' for purchasing goods.

The communications unit 54 transmits data delivered from the NFC I/F 52 or the data input and display unit 53 (e.g., the random number $R_Y$ and the instruction message) to the telecommunications carrier-A server 23 in the form of an e-mail via the Internet 22. Additionally, the communications unit 54 delivers mail data received from the telecommunications carrier-A server 23 to the NFC I/F 52 or the data input and display unit 53.

The memory 55 stores the communication data (communication message) between the communications unit 54 and the telecommunications carrier-A server 23 for a predetermined period of time. The memory 55 also stores the merchant's terminal ID and the telecommunications carrier $ID_A$ provided by the telecommunications carrier A.

The control unit 56 includes, for example, a central processing unit (CPU). The control unit 56 controls components of the merchant's terminal 21. For example, the control unit 56 controls the communication functions of the NFC I/F 52 or the communications unit 54.

The operation of each block shown in FIG. 2 is now herein described when the user X replenishes the amount M of electronic money in the bank account of the user X in the bank D.

When the user X places his or her personal terminal 11 above the NFC communications apparatus 21*a* of the merchant's terminal 21 at the store Y, the NFC I/F 42 communicates with the NFC I/F 52 using Near Field Communication to exchange terminal IDs and telecommunications carrier information (hereinafter collectively referred to as "exchange information").

That is, the NFC I/F 42 transmits the personal terminal ID and the telecommunications carrier $ID_B$ to the NFC I/F 52, while the NFC I/F 52 transmits the merchant's terminal ID and the telecommunications carrier IDA to the NFC I/F 42.

The NFC I/F 52 of the merchant's terminal 21 then delivers a random number $R_Y$ generated by the random number generation unit 51, and the personal terminal ID and the telecommunications carrier $ID_B$ received from the personal terminal 11 using Near Field Communication to the communications unit 54;

Additionally, the user X informs a store personnel of the amount M of electronic money to be replenished (hereinafter referred to as "replenish amount M"). The store personnel then inputs the amount M into the data input and display unit 53.

Upon receiving the input replenish amount M, the data input and display unit 53 delivers it to the communications unit 54.

The communications unit 54 transmits the random number $R_Y$ received from the NFC I/F 52 and the replenish amount M to the telecommunications carrier-A server 23 in the form of an e-mail which includes the personal terminal ID and the telecommunications carrier $ID_B$ as a destination.

The telecommunications carrier-A server 23 requests the bank account-C server 24 to check the balance in the account of the store Y and determines whether a sufficient amount of money (balance) to transfer the replenish amount M is available in the account of the store Y. If a sufficient amount of money to transfer the replenish amount M is available in the account of the store Y, the telecommunications carrier-A server 23 makes an arrangement to transfer the replenish amount M with the bank account-C server 24.

In addition, the telecommunications carrier-A server 23 transmits fund transfer arrangement information (fund transfer guarantee information) indicating the result of fund transfer arrangement and the random number $R_Y$ to the telecommunications carrier-B server 14, which is identified by the telecommunications carrier $ID_B$, in the form of an e-mail which includes the personal terminal ID as a destination.

The telecommunications carrier-B server 14 retrieves the amount of money transfer (i.e., the replenish amount M), which is transmitted from the merchant's terminal 21, from the fund transfer arrangement information received from the telecommunications carrier-A server 23 and stores the amount of money transfer inside the telecommunications carrier-B server 14. Furthermore, the telecommunications carrier-B server 14 transmits the fund transfer arrangement information and the random number $R_Y$ received from the telecommunications carrier-A server 23 to the communications unit 44 of the personal terminal 11 identified by the personal terminal ID in the form of an e-mail via, for example, the telephone network 13.

Upon receiving the fund transfer arrangement information and the random number $R_Y$ from the telecommunications carrier-A server 23, the communications unit 44 delivers the fund transfer arrangement information to the data input and display unit 43 and delivers the random number $R_Y$ to the NFC I/F 42.

The data input and display unit 43 displays information for checking the replenish amount M on the basis of the fund transfer arrangement information from the communications unit 44.

In contrast, the NFC I/F 42 of the personal terminal 11, which has received the merchant's terminal ID and the telecommunications carrier $ID_A$ using Near Field Communication, delivers that information to the communications unit 44 together with the random number $R_X$ delivered from the random number generation unit 41.

The communications unit 44 delivers the random number $R_X$ received from the NFC I/F 42 to the telecommunications carrier-B server 14 via, for example, the telephone network 13 while specifying the merchant's terminal ID and the telecommunications carrier $ID_A$ as a destination. The telecommunications carrier-B server 14 transmits the random number $R_X$ received from the communications unit 44 of the personal terminal 11 to the telecommunications carrier-A server 23 identified by the telecommunications carrier $ID_A$ in the form of an e-mail including the merchant's terminal ID as a destination.

The telecommunications carrier-A server 23 transmits the random number $R_X$ received from the telecommunications carrier-B server 14 to the communications unit 54 of the merchant's terminal 21 identified by the merchant's terminal ID via the Internet 22. The communications unit 54 of the merchant's terminal 21 transmits the random number $R_X$ received from the telecommunications carrier-A server 23 to the NFC I/F 52.

The user checks the replenish amount M displayed on the data input and display unit 43 of the personal terminal 11 and places the personal terminal 11 above the NFC communications apparatus 21a of the merchant's terminal 21 at the store Y again.

Thus, the NFC I/F 42 communicates with the NFC I/F 52 using Near Field Communication. The NFC I/F 42 transmits the random number $R_Y$ received from the communications unit 44 to the NFC I/F 52, while the NFC I/F 52 transmits the random number $R_X$ received from the communications unit 54 to the NFC I/F 42. That is, the NFC I/F 42 and the NFC I/F 52 exchange the random numbers $R_X$ and $R_Y$.

The control unit 46 of the personal terminal 11 compares the random number received from the NFC I/F 52 of the merchant's terminal 21 by the NFC I/F 42 (i.e., the random number $R_X$) with the random number $R_X$ generated by the random number generation unit 41 and transmitted from the communications unit 44 to the merchant's terminal 21. If these random numbers $R_X$ are equal, the control unit 46 instructs the data input and display unit 43 to display that information. Alternatively, the personal terminal 11 may include a sound output unit for outputting, for example, the sound of buzzer and the personal terminal 11 may output the sound of buzzer when these random numbers $R^X$ are equal. Thus, the user can recognize that information.

Additionally, the control unit 56 of the merchant's terminal 21 compares the random number received by the NFC I/F 52 from the NFC I/F 42 of the personal terminal 11 (i.e., the random number $R_Y$) with the random number $R_Y$ generated by the random number generation unit 51 and transmitted from the communications unit 54 to the personal terminal 11. If these random numbers $R_Y$ are equal, the control unit 56 instructs the data input and display unit 53 to display that information. Alternatively, the merchant's terminal 21 may include a sound output unit for outputting, for example, the sound of buzzer and the merchant's terminal 21 may output the sound of buzzer when these random numbers $R_Y$ are equal. Thus, the user can recognize that information.

After recognizing that the random numbers $R_X$ are equal using the data input and display unit 43, the user X gives cash corresponding to the replenish amount M to the store personnel.

Upon receiving the cash corresponding to the replenish amount M, the store personnel inputs, to the data input and display unit 53, an instruction to start a fund transfer of the replenish amount M.

Upon receiving the instruction to start a fund transfer of the replenish amount M, the data input and display unit 53 delivers the fund transfer instruction to the communications unit 54. The communications unit 54 transmits that fund transfer instruction (instruction message) to the telecommunications carrier-A server 23 in the form of an e-mail via the Internet 22. The telecommunications carrier-A server 23 transfers that fund transfer instruction to the bank account-C server 24.

In response to the fund transfer instruction from the telecommunications carrier-A server 23, the bank account-C server 24 transfers the replenish amount M from the account of the store Y to the account of the user X in the bank account-D server 15.

It should be noted that the information about the account of the user X (i.e., account to which fund is transferred) is acquired (returned) from the telecommunications carrier-B server 14 when, for example, the telecommunications carrier-A server 23 transmits the fund transfer arrangement information of the replenish amount M to the telecommunications carrier-B server 14. Alternatively, if the telecommunications carrier A has traded with the user X before, the telecommunications carrier-A server 23 may identify the account of the user X from the transaction history.

The bank account-D server 15 receives the fund transferred from the bank account-C server 24 and replenishes the replenish amount M of electronic money in the account of the user X. That is, the bank account-D server 15 increases the balance in the account of the user X by the replenish amount M.

Additionally, the bank account-D server 15 sends an e-mail including replenishment transaction information indicating that the replenish amount M has been correctly replenished in the account of the user X to the personal terminal 11 via the telecommunications carrier-B server 14 and, for example, the telephone network 13. As a result, that information is displayed on the data input and display unit 43 of the personal terminal 11.

Furthermore, the bank account-D server 15 sends, to the bank account-C server 24, an e-mail including fund transfer transaction information indicating that the bank account-D server 15 has correctly received the replenish amount M by the fund transfer. The bank account-C server 24 transfers that e-mail to the merchant's terminal 21 via the telecommunications carrier-A server 23 and, for example, the Internet 22. The data input and display unit 53 of the merchant's terminal 21 then displays the result of the fund transfer of the replenish amount M (the result of the fund transfer instruction) on the basis of the fund transfer transaction information from the bank account-C server 24.

The operation of each block shown in FIG. 2 is now herein described when the user X purchases goods costing the purchase amount M' at the store Y using electronic money deposited in his or her own account in the bank D.

The user X inputs the amount M' of money for purchased goods (hereinafter referred to as "purchase amount M''") into the data input and display unit 43 of the personal terminal 11. The data input and display unit 43 receives the purchase amount M' input by the user X and delivers it to the communications unit 44.

Additionally, the user X places his or her personal terminal 11 above the NFC communications apparatus 21a of the merchant's terminal 21 at the store Y. As in the case for replenishing electronic money, the NFC I/F 42 communicates with the NFC I/F 52 using Near Field Communication to exchange terminal IDs and telecommunications carrier information (exchange information).

Subsequently, the NFC I/F 52 of the merchant's terminal 21 delivers a random number $R_Y$ generated by the random number generation unit 51, and the personal terminal ID and the telecommunications carrier $ID_B$ received from the personal terminal 11 using Near Field Communication to the communications unit 54.

The communications unit 54 transmits the random number $R_Y$ received from the NFC I/F 52 to the telecommunications carrier-A server 23 via the Internet 22 in the form of an e-mail which includes the personal terminal ID and the telecommunications carrier $ID_B$ as a destination.

The telecommunications carrier-A server 23 transmits the random number $R_Y$ received from the merchant's terminal 21 to the telecommunications carrier-B server 14 identified by the telecommunications carrier $ID_B$ in the form of an e-mail which includes the personal terminal ID as a destination. The telecommunications carrier-B server 14 transmits the random number $R_Y$ received from the telecommunications carrier-A server 23 to the communications unit 44 of the personal terminal 11 identified by the personal terminal ID via the telephone network 13 in the form of an e-mail.

The communications unit 44 delivers the random number $R_Y$ received from the telecommunications carrier-B server 14 to the NFC I/F 42.

In addition, the NFC I/F 42 of the personal terminal 11, which has received the merchant's terminal ID and the telecommunications carrier $ID_A$ from the merchant's terminal 21 using Near Field Communication, delivers that information to the communications unit 44 together with the random number $R_X$ delivered from the random number generation unit 41.

The communications unit 44 transmits the random number $R_X$ delivered from the NFC I/F 42 to the telecommunications carrier-B server 14 together with the purchase amount M' via, for example, the telephone network 13 in the form of an e-mail including the merchant's terminal ID and the telecommunications carrier $ID_A$ as a destination.

The telecommunications carrier-B server 14 requests the bank account-D server 15 to check the balance in the account of the user X and determines whether a sufficient amount (balance) to cover the purchase amount M' to be transferred (or to be paid) is available in the account of the user X. If it is determined that a sufficient amount to cover the purchase amount M' is available in the account of the user X, the telecommunications carrier-B server 14 makes an arrangement with the bank account-D server 15 to transfer the purchase amount M' from that account.

Additionally, the telecommunications carrier-B server 14 transmits fund transfer arrangement information (fund transfer guarantee information), which represents the result of the fund transfer arrangement, and the random number $R_X$ to the telecommunications carrier-A server 23 identified by the telecommunications carrier $ID_A$ in the form of an e-mail including the merchant's terminal ID as a destination.

The telecommunications carrier-A server 23 retrieves the amount to be transferred (the purchase amount M') from the fund transfer arrangement information transmitted from the telecommunications carrier-B server 14 and stores it inside the telecommunications carrier-A server 23. Furthermore, the telecommunications carrier-A server 23 transmits the fund transfer arrangement information and the random number $R_X$ transmitted from the telecommunications carrier-B server 14 to the communications unit 54 of the merchant's terminal 21 identified by the merchant's terminal ID via the Internet 22.

Upon receiving the fund transfer arrangement information and the random number $R_X$ from the telecommunications carrier-A server 23, the communications unit 54 delivers the fund transfer arrangement information to the data input and display unit 53 and delivers the random number $R_X$ to the NFC I/F 52.

The data input and display unit 53 displays information for checking the purchase amount M' on the basis of the fund transfer arrangement information from the communications unit 54.

The store personnel confirms the purchase amount M' displayed on the data input and display unit 53 and requests the user X to place the personal terminal 11 above the NFC communications apparatus 21a of the merchant's terminal 21 at the store Y again.

When the user X places the personal terminal 11 above the NFC communications apparatus 21a of the merchant's terminal 21 in response to the store personnel's request, the NFC I/F 42 communicates with the NFC I/F 52 using Near Field Communication. The NFC I/F 42 transmits the random number $R_Y$ received from the communications unit 44 to the NFC I/F 52, while the NFC I/F 52 transmits the random number $R_X$ received from the communications unit 54 to the NFC I/F 42. That is, the NFC I/F 42 and the NFC I/F 52 exchange the random numbers $R_X$ and $R_Y$.

The control unit 46 of the personal terminal 11 compares the random number received from the NFC I/F 52 of the merchant's terminal 21 by the NFC I/F 42 (i.e., the random number $R_X$) with the random number $R_X$ generated by the random number generation unit 41 and transmitted from the communications unit 44 to the merchant's terminal 21. If these random numbers $R_X$ are equal, the control unit 46 instructs the data input and display unit 43 to display that information. Alternatively, the personal terminal 11 may include a sound output unit for outputting, for example, the sound of buzzer and the personal terminal 11 may output the sound of buzzer when these random numbers $R_X$ are equal. Thus, the user can recognize that information.

Additionally, the control unit 56 of the merchant's terminal 21 compares the random number received by the NFC I/F 52 from the NFC I/F 42 of the personal terminal 11 (i.e., the random number $R_Y$) with the random number $R_Y$ generated by the random number generation unit 51 and transmitted from the communications unit 54 to the personal terminal 11. If these random numbers $R_Y$ are equal, the control unit 56 instructs the data input and display unit 53 to display that information. Alternatively, the merchant's terminal 21 may include a sound output unit for outputting, for example, the sound of buzzer and the merchant's terminal 21 may output the sound of buzzer when these random numbers $R_Y$ are equal. Thus, the user can recognize that information.

After recognizing that the random numbers $R_X$ are equal using the data input and display unit 43, the user X inputs an instruction to transfer the purchase amount M' of money (fund transfer) into the data input and display unit 43.

Upon receiving the fund transfer instruction for the purchase amount M', the data input and display unit 43 delivers the fund transfer instruction to the communications unit 44. The communications unit 44 sends the fund transfer instruction (instruction message) to the telecommunications carrier-B server 14 via, for example, the telephone network 13 in the form of an e-mail. The telecommunications carrier-B server 14 then delivers the e-mail to the bank account-D server 15.

In response to the fund transfer instruction from the telecommunications carrier-B server 14, the bank account-D server 15 transfers the purchase amount M' from the account of the user X to the account of the store Y in the bank account-C server 24.

It should be noted that the information about the account of the store Y (i.e., account to which fund is transferred) is acquired (returned) from the telecommunications carrier-A server 23 when, for example, the telecommunications carrier-B server 14 transmits the fund transfer arrangement information of the purchase amount M' to the telecommunications carrier-A server 23. Alternatively, if the telecommunications carrier-B has traded with the store Y before, the telecommunications carrier-B server 14 may identify the account of the store Y from the transaction history.

The bank account-C server 24 receives the fund transferred from the bank account-D server 15 and replenishes the purchase amount M' of electronic money in the account of the store Y. That is, the bank account-C server 24 increases the balance in the account of the store Y by the purchase amount M'.

Additionally, the bank account-C server 24 sends an e-mail including replenishment transaction information indicating that the purchase amount M' has been correctly replenished in the account of the store Y to the merchant's terminal 21 via the telecommunications carrier-A server 23 and the Internet 22. As a result, that information is displayed on the data input and display unit 53 of the merchant's terminal 21.

Furthermore, the bank account-C server 24 sends, to the bank account-D server 15, an e-mail including fund transfer transaction information indicating that the bank account-C server 24 has correctly received the purchase amount M' by the fund transfer. The bank account-D server 15 transfers that e-mail to the personal terminal 11 via the telecommunications carrier-B server 14 and, for example, the telephone network 13. The data input and display unit 43 of the personal terminal 11 then displays the result of the payment of the purchase amount M' of electronic money (the result of the fund transfer instruction) on the basis of the fund transfer transaction information from the bank account-D server 15.

In the communications system 1 having such a configuration, the random number generation unit 41 of the personal terminal 11 generates a random number $R_X$ that is effective for only one transmission message. Thereafter, the communications unit 44 transmits the random number $R_X$ to the merchant's terminal 21 via a predetermined communication channel (e.g., the telephone network 13 and the Internet 22) and receives a random number $R_Y$ transmitted from the merchant's terminal 21 via the predetermined communication channel. The NFC I/F 42 receives a random number (message) transmitted from the NFC I/F 52 of the merchant's terminal 21 using Near Field Communication and transmits the random number $R_Y$ received by the communications unit 44 to the NFC I/F 52 of the merchant's terminal 21 using Near Field Communication. The control unit 46 determines whether the random number received by the NFC I/F 42 is equal to the random number $R_X$ transmitted from the communications unit 44 via the predetermined communication channel.

The random number generation unit 51 of the merchant's terminal 21 generates a random number $R_Y$ that is effective for only one transmission message. Thereafter, the communications unit 54 transmits the random number $R_Y$ to the personal terminal 11 via a predetermined communication channel (e.g., the telephone network 13 and the Internet 22) and receives a random number $R_X$ transmitted from the personal terminal 11 via a predetermined communication channel. The NFC I/F 52 receives a random number (message) transmitted from the NFC I/F 42 of the personal terminal 11 using Near Field Communication and transmits the random number $R_X$ received by the communications unit 54 to the NFC I/F 42 of the personal terminal 11 using Near Field Communication. The control unit 56 determines whether the random number received by the NFC I/F 52 is equal to the random number $R_Y$ transmitted from the communications unit 54 via the predetermined communication channel.

That is, each of the personal terminal 11 and the merchant's terminal 21 indirectly transmits a transmission message via a predetermined communication channel, and subsequently, checks whether a message directly received via Near Field Communication is equal to the transmission message transmitted indirectly.

In the above-described example, there is a one-to-one correspondence between a unique terminal ID, which is provided by the communications carrier to which a user (the user X or the store Y) has subscribed, and a bank account (and mail address) that the user has registered to the communications carrier. However, the user may have the following two types of accounts: an account to which the other party transfers electronic money (deposit account) and an account from which the user transfers electronic money to another account (withdrawal account). In addition, the unique terminal ID provided by the communications carrier may be transient and may be changed periodically.

This design further protects the user's anonymity from the other party. In addition, periodically changing the deposit account of the user further protects the user's anonymity. Thus, the user can reduce spam mails transmitted to the mail address provided by the mail service of the communications carrier to which the user has subscribed.

That is, by using a third party (i.e., communications carrier) as an agent, the user of the personal terminal 11 or the merchant's terminal 21 cannot be identified directly.

Figure 3:
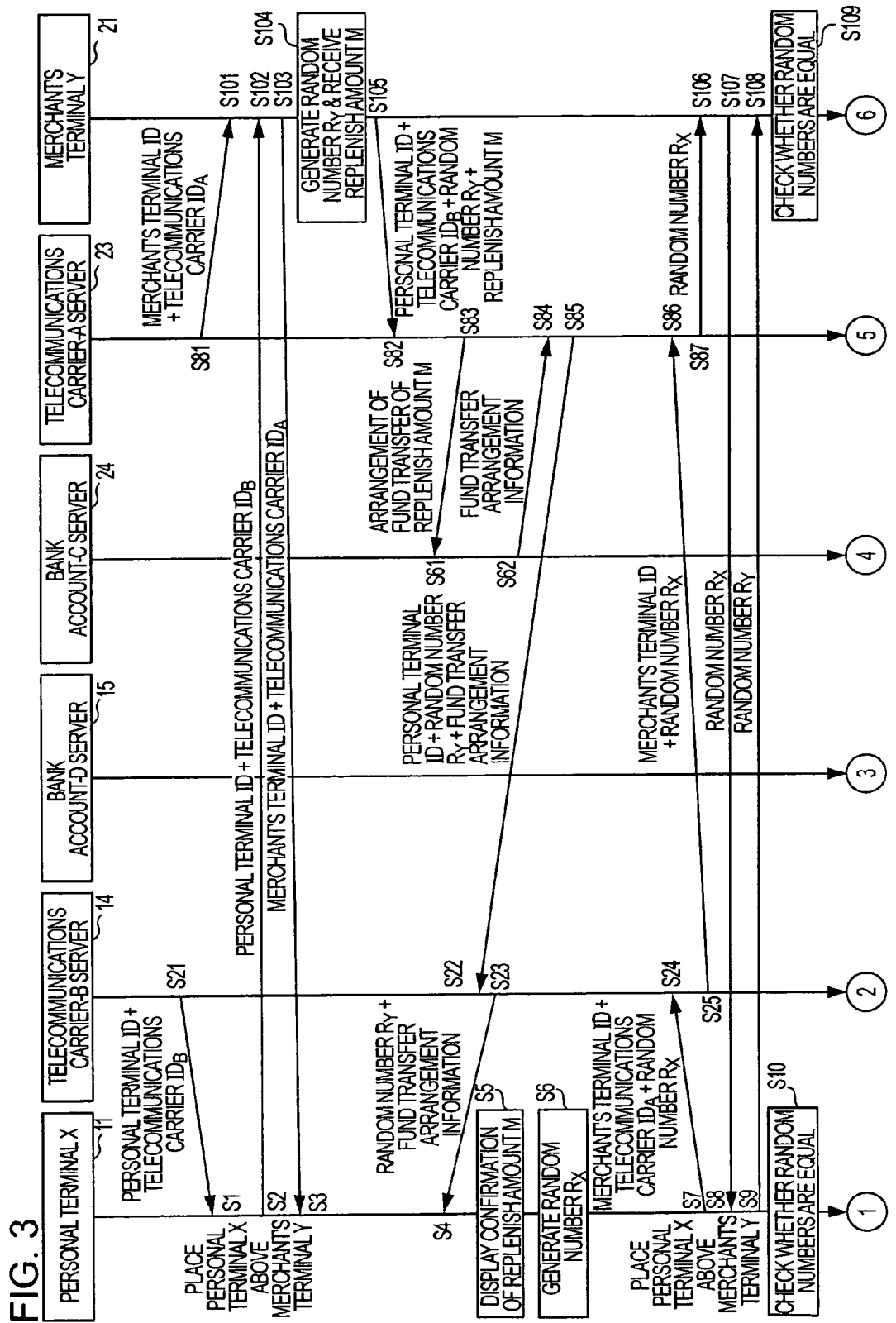
FIG. 3 is a flow diagram illustrating a replenishment process in the communication system.
Figure 4:
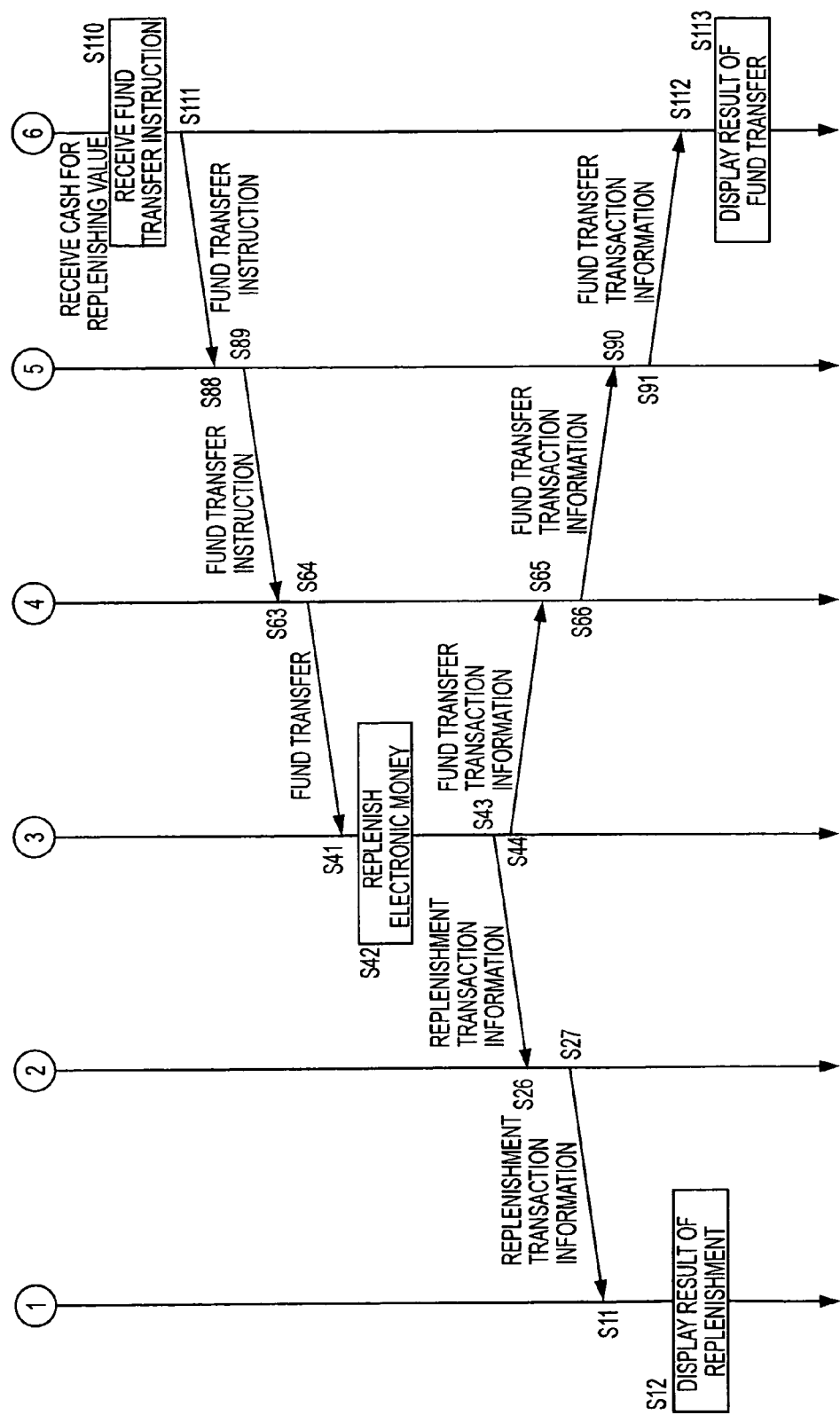
FIG. 4 is a continuation of the flow diagram of FIG. 3.

FIGS. 3 and 4 illustrate a flow diagram in the communications system 1 shown in FIG. 2 when an amount M of electronic money is replenished in a bank account of the user X in the bank D.

At step S21, the telecommunications carrier-B server 14 transmits, to the personal terminal 11 of the user X who has subscribed various services provided by the telecommunications carrier B, the personal terminal ID for identifying the personal terminal 11 and the telecommunications carrier $ID_B$ for identifying the telecommunications carrier B. At step S1, the communications unit 44 of the personal terminal 11 receives this information and stores it in the memory 45.

At step S81, the telecommunications carrier-A server 23 transmits, to the merchant's terminal 21 of the store Y who has subscribed various services provided by the telecommunications carrier A, the merchant's terminal ID for identifying the merchant's terminal 21 and the telecommunications carrier $ID_A$ for identifying the telecommunications carrier A. At step S101, the communications unit 54 of the merchant's terminal 21 receives this information and stores it in the memory 55.

The processes at the above-described steps are executed in advance when the user X and the store Y make an agreement on the use of the various services with the telecommunications carrier B and the telecommunications carrier A, respectively.

When the user X places the personal terminal 11 above the NFC communications apparatus 21a of the merchant's terminal 21 at the store Y in order to replenish the account with the amount M of electronic money, the personal terminal 11, at step S2, transmits the personal terminal ID and the telecommunications carrier $ID_B$ to the merchant's terminal 21 using Near Field Communication. At step S102, the merchant's terminal 21 receives this information.

Additionally, at step S103, the merchant's terminal 21 transmits the merchant's terminal ID and the telecommunications carrier $ID_A$ to the personal terminal 11 using Near Field Communication. At step S3, the personal terminal 11 receives this information. It is noted that either one of the process at steps S2 and S102 and the process at steps S103 and S3 may be executed first. Alternatively, both the processes may be executed at the same time.

When a store personnel inputs the replenish amount M into the merchant's terminal 21, the merchant's terminal 21, at step S104, receives the replenish amount M and generates a random number $R_Y$.

At step S105, the merchant's terminal 21 transmits the generated random number $R_Y$ and the replenish amount M input by the store personnel to the telecommunications carrier-A server 23 via the Internet 22 in the form of an e-mail including the personal terminal ID and the telecommunications carrier $ID_B$ received from the personal terminal 11 as a destination using Near Field Communication.

At step S82, the telecommunications carrier-A server 23 receives the e-mail including the random number $R_Y$ and the replenish amount M input from the merchant's terminal 21 and including the personal terminal ID and the telecommunications carrier $ID_B$ designated as destinations. At step S83, the telecommunications carrier-A server 23 requests the bank account-C server 24 to check a balance in the account of the store Y and determines whether a sufficient amount of money (balance) to transfer the replenish amount M is available in the account of the store Y. Additionally, at step S83, the telecommunications carrier-A server 23 makes an arrangement to transfer the replenish amount M with the bank account-C server 24.

At step S61, the bank account-C server 24 receives the arrangement to transfer the replenish amount M from the telecommunications carrier-A server 23. The process then proceeds to step S62, where the bank account-C server 24 transmits fund transfer arrangement information indicating that the bank account-C server 24 accepts the arrangement to transfer the replenish amount M to the telecommunications carrier-A server 23 in the form of an e-mail.

At step S84, the telecommunications carrier-A server 23 receives the mail including the fund transfer arrangement information from the bank account-C server 24. The process then proceeds to step S85, where the telecommunications carrier-A server 23 transmits the fund transfer arrangement information and the random number $R_Y$ to the telecommunications carrier-B server 14 identified by the telecommunications carrier $ID_B$ in the form of an e-mail including the personal terminal ID as a destination.

At step S22, the telecommunications carrier-B server 14 receives the e-mail including the fund transfer arrangement information and the random number $R_Y$ from the telecommunications carrier-A server 23. The process then proceeds to step S23, where the telecommunications carrier-B server 14 transmits the received mail to the personal terminal 11 identified by the personal terminal ID via, for example, the telephone network 13.

At step S4, the personal terminal 11 receives the e-mail including the fund transfer arrangement information and the random number $R_Y$ from the telecommunications carrier-B server 14. The process then proceeds to step S5, where the personal terminal 11 displays the replenish amount M for the user to confirm it on the basis of the fund transfer arrangement information.

At step S6, the personal terminal 11 generates a random number $R_X$. The process then proceeds to step S7, where the personal terminal 11 transmits the generated random number $R_X$ to the telecommunications carrier-B server 14 via the Internet 22 in the form of an e-mail including the merchant's terminal ID and the telecommunications carrier $ID_A$ received at step S3 as a destination.

At step S24, the telecommunications carrier-B server 14 receives the e-mail including the random number $R_X$ from the personal terminal 11. The process then proceeds to step S25, where the telecommunications carrier-B server 14 transmits the e-mail including the merchant's terminal ID as a destination to the telecommunications carrier-A server 23 identified by the telecommunications carrier $ID_A$.

At step S86, the telecommunications carrier-A server 23 receives the e-mail including the random number $R_X$ from the telecommunications carrier-B server 14. The process then proceeds to step S87, where the telecommunications carrier-A server 23 transmits the e-mail to the merchant's terminal 21 identified by the merchant's terminal ID via the Internet 22.

At step S106, the merchant's terminal 21 receives the e-mail including the random number $R_X$ from the telecommunications carrier-A server 23.

Either the series of the processes at steps S104, S105, S82, S83, S61, S62, S84, S85, S22, S23, S4, and S5 or the series of the processes of steps S6, S7, S24, S25, S86, S87, and S106 may be executed first. Also, both may be executed at the same time. In other words, the personal terminal 11 can execute the process at step S6 immediately after it executes the process at step S3.

The user confirms the replenish amount M displayed on the personal terminal 11 at step S5 and places the personal terminal 11 above the merchant's terminal 21 at the store Y again.

Thus, the personal terminal 11 and the merchant's terminal 21 exchange the random number $R_X$ and the random number $R_Y$. That is, the merchant's terminal 21, at step S107, transmits the random number $R_X$ to the personal terminal 11 using Near Field Communication, while the personal terminal 11, at step S8, receives the random number $R_X$. Also, the personal terminal 11, at step S9, transmits the random number $R_Y$ to the merchant's terminal 21 using Near Field Communication, while the merchant's terminal 21, at step S108, receives the random number $R_Y$. Either one of the process at steps S107 and S8 and the process at steps S9 and S108 may be executed first. Alternatively, both the processes may be executed at the same time.

After the process at step S9 is completed, the personal terminal 11, at step S10, compares the random number received from the merchant's terminal 21 by using Near Field Communication (i.e., the random number $R_X$) with the random number $R_X$ generated by itself (the random number generation unit 41) and transmitted to the merchant's terminal 21 via the telecommunications carrier B. The personal terminal 11 then displays the result of the comparison on the data input and display unit 43.

After the process at step S108 is completed, the merchant's terminal 21, at step S109, compares the random number received from the personal terminal 11 using Near Field Communication (i.e., the random number $R_Y$) with the random number $R_Y$ generated by itself (the random number generation unit 51) and transmitted to the personal terminal 11 via the telecommunications carrier A. The merchant's terminal 21 then displays the result of the comparison on the data input and display unit 53.

The user X confirms that these two random numbers $R_X$ are equal, and subsequently, gives cash corresponding to the replenish amount M to the store personnel. Upon receiving the cash corresponding to the replenish amount M, the store personnel inputs, to the merchant's terminal 21, an instruction to start a fund transfer of the replenish amount M.

At step S110, the merchant's terminal 21 receives the instruction to start a find transfer of the replenish amount M in response to the input of the find transfer instruction from the store personnel. The process then proceeds to step S111, where the merchant's terminal 21 transmits an e-mail including fund transfer instruction of the replenish amount M to the telecommunications carrier-A server 23 via the Internet 22.

At step S88, the telecommunications carrier-A server 23 receives the e-mail including the fund transfer instruction from the merchant's terminal 21. The process then proceeds to step S89, where the telecommunications carrier-A server 23 transmits the received e-mail to the bank account-C server 24.

At step S63, the bank account-C server 24 receives the e-mail including the fund transfer instruction from the telecommunications carrier-A server 23. At step S64, in response to the fund transfer instruction, the bank account-C server 24 transfers the replenish amount M from the account of the store Y to the account of the user X in the bank account-D server 15.

At step S41, the bank account-D server 15 accepts the fund transfer of the replenish amount M from the bank account-C server 24. The process then proceeds to step S42, where the bank account-D server 15 replenishes the account of the user X with the replenish amount M of electronic money.

At step S43, the bank account-D server 15 transmits, to the telecommunications carrier-B server 14, an e-mail including the replenishment transaction information indicating that the replenish amount M has been correctly replenished in the account of the user X.

At step S26, the telecommunications carrier-B server 14 receives the e-mail including the replenishment transaction information from the bank account-D server 15. The process then proceeds to step S27, where the telecommunications carrier-B server 14 transmits the e-mail to the personal terminal 11 via, for example, the telephone network 13.

At step S11, the personal terminal 11 receives the e-mail including the replenishment transaction information from the telecommunications carrier-B server 14. At step S12, the personal terminal 11 displays the result of the fund transfer of the replenish amount M of electronic money (the balance in the account of the user X in the bank D) on the basis of the replenishment transaction information.

Additionally, after the process at step S43 is completed, the bank account-D server 15, at step S44, transmits an e-mail including fund transfer transaction information indicating that it has received the replenish amount M by the fund transfer to the bank account-C server 24.

At step S65, the bank account-C server 24 receives the e-mail including the fund transfer transaction information from the bank account-D server 15. The process then proceeds to step S66, where the bank account-C server 24 transmits that e-mail to the telecommunications carrier-A server 23.

At step S90, the telecommunications carrier-A server 23 receives the e-mail including the fund transfer transaction information from the bank account-C server 24. The process then proceeds to step S91, where the telecommunications carrier-A server 23 transmits that e-mail to the merchant's terminal 21 via the Internet 22.

At step S112, the merchant's terminal 21 receives the e-mail including the fund transfer transaction information from the telecommunications carrier-A server 23. The process then proceeds to step S113, where the merchant's terminal 21 displays the result of the fund transfer of the replenish amount M of electronic money (the result of the fund transfer instruction) on the basis of the fund transfer transaction information.

Figure 5:
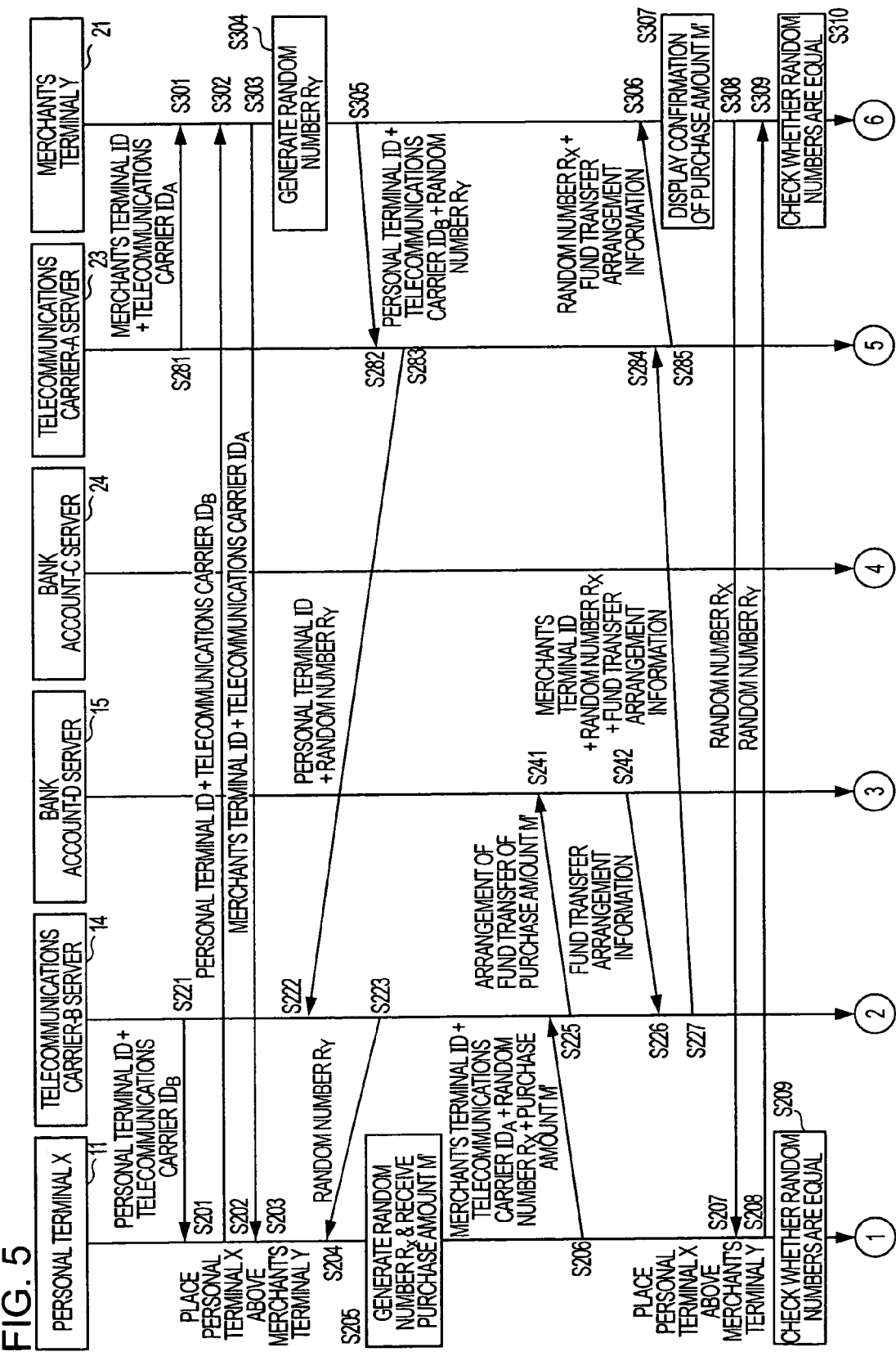
FIG. 5 is a flow diagram illustrating a process to purchase goods in the communication system.
Figure 6:
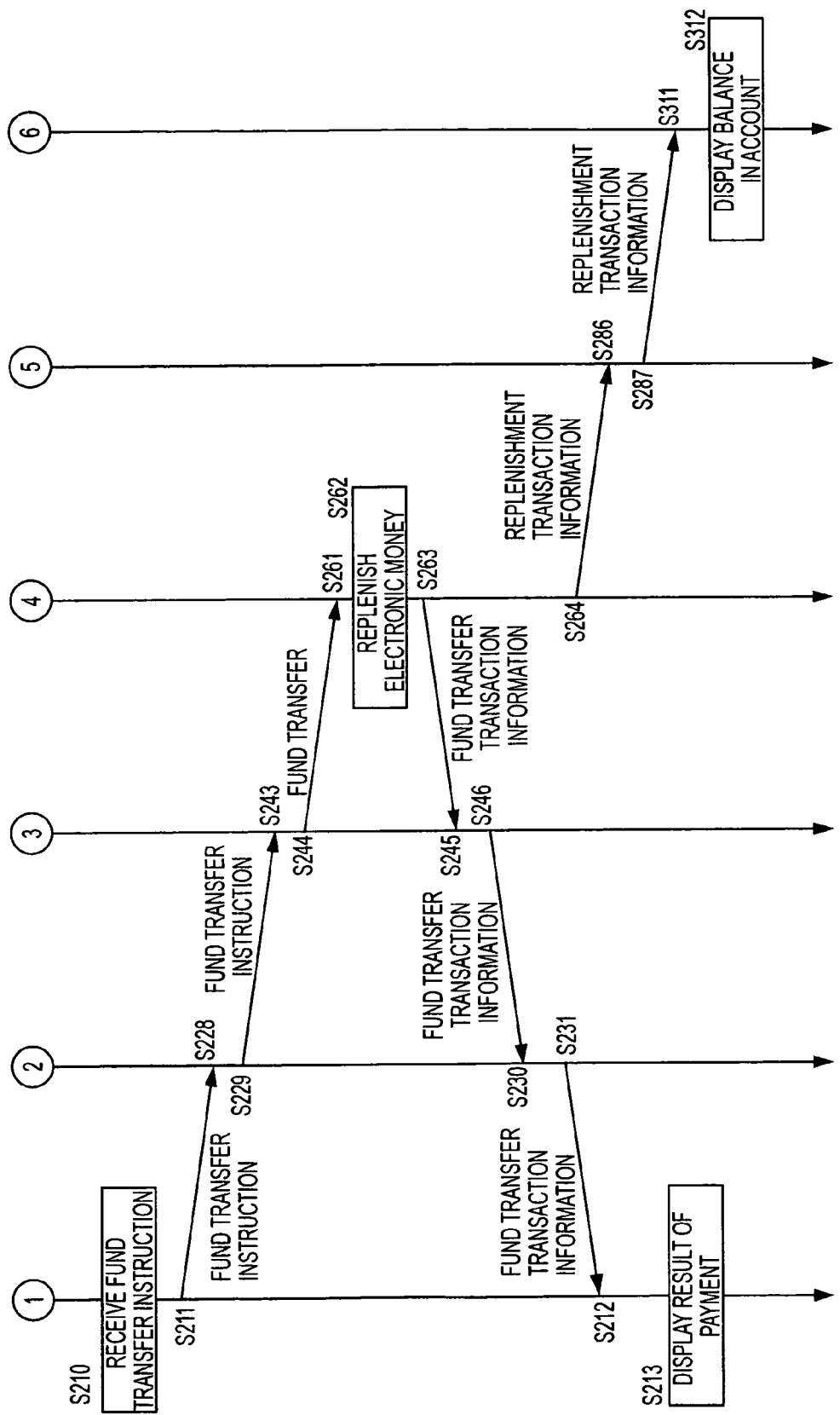
FIG. 6 is a continuation of the flow diagram of FIG. 5.

The process in the communications system 1 shown in FIG. 2 for purchasing goods costing the purchase amount M' at the store Y is now herein described with reference to a flow diagram in FIGS. 5 and 6.

At step S221, the telecommunications carrier-B server 14 transmits, to the personal terminal 11 of the user X who has subscribed various services provided by the telecommunications carrier B, the personal terminal ID for identifying the personal terminal 11 and the telecommunications carrier $ID_B$ for identifying the telecommunications carrier B. At step S201, the communications unit 44 of the personal terminal 11 receives this information and stores it in the memory 45.

At step S281, the telecommunications carrier-A server 23 transmits, to the merchant's terminal 21 of the store Y who has subscribed various services provided by the telecommunications carrier A, the merchant's terminal ID for identifying the merchant's terminal 21 and the telecommunications carrier $ID_A$ for identifying the telecommunications carrier A. At step S301, the communications unit 54 of the merchant's terminal 21 receives this information and stores it in the memory 55.

The processes at the above-described steps are executed in advance when the user X and the store Y make an agreement on the use of the various services with the telecommunications carrier B and the telecommunications carrier A, respectively.

When the user X places the personal terminal 11 above the NFC communications apparatus 21a of the merchant's terminal 21 at the store Y in order to purchase goods costing a purchase amount M', the personal terminal 11, at step S202, transmits the personal terminal ID and the telecommunications carrier $ID_B$ to the merchant's terminal 21 using Near Field Communication. At step S302, the merchant's terminal 21 receives this information.

Additionally, at step S303, the merchant's terminal 21 transmits the merchant's terminal ID and the telecommunications carrier $ID_A$ to the personal terminal 11 using Near Field Communication. At step S203, the personal terminal 11 receives this information. It is noted that either one of the process at steps S202 and S302 and the process at steps S303 and S203 may be executed first. Alternatively, both the processes may be executed at the same time.

After the process at step S303 is completed, the merchant's terminal 21, at step S304, generates a random number $R_Y$. The process then proceeds to step S305, where the merchant's terminal 21 transmits the generated random number $R_Y$ to the telecommunications carrier-A server 23 via the Internet 22 in the form of an e-mail including the personal terminal ID and the telecommunications carrier $ID_B$ received at step S302 as a destination.

At step S282, the telecommunications carrier-A server 23 receives the e-mail including the random number $R_Y$ from the merchant's terminal 21. The process then proceeds to step S283, where the telecommunications carrier-A server 23 appends the personal terminal ID to the e-mail as a destination and transmits the e-mail to the telecommunications carrier-B server 14 identified by the telecommunications carrier $ID_B$.

At step S222, the telecommunications carrier-B server 14 receives the e-mail including the random number $R_Y$ from the telecommunications carrier-A server 23. The process then proceeds to step S223, where the telecommunications carrier-B server 14 transmits the e-mail to the personal terminal 11 identified by the personal terminal ID via, for example, the telephone network 13.

At step S204, the personal terminal 11 receives the e-mail including the random number $R_Y$ from the telecommunications carrier-B server 14.

The user X inputs the purchase amount M' for the goods into the data input and display unit 43 of the personal terminal 11. At step S205, the personal terminal 11 receives the purchase amount M' input by the user X and generates a random number $R_X$.

At step S206, the personal terminal 11 transmits the generated random number $R_X$ and the received purchase amount M' to the telecommunications carrier-B server 14 via, for example, the telephone network 13 in the form of an e-mail including the merchant' terminal ID and the telecommunications carrier $ID_A$ received from the merchant's terminal 21 as a destination using Near Field Communication.

At step S224, the telecommunications carrier-B server 14 receives the e-mail including the random number $R_X$ and the purchase amount M' from the personal terminal 11 and including the merchant' terminal ID and the telecommunications carrier $ID_A$ as a destination. At step S225, the telecommunications carrier-B server 14 requests the bank account-D server 15 to check the balance in the account of the user X and determines whether a sufficient amount of money (balance) to transfer (pay) the purchase amount M' is available in the account of the user X. In addition, at step S225, the telecommunications carrier-B server 14 makes an arrangement to transfer the purchase amount M' with the bank account-D server 15.

At step S241, the bank account-D server 15 accepts the arrangement to transfer the purchase amount M' from the telecommunications carrier-B server 14. The process then proceeds to step S242, where the bank account-D server 15 transmits the fund transfer arrangement information indicating that an arrangement to transfer the purchase amount M' has been accepted to the telecommunications carrier-B server 14 in the form of an e-mail.

At step S226, the telecommunications carrier-B server 14 receives the e-mail including the fund transfer arrangement information from the bank account-D server 15. The process then proceeds to step S227, where the telecommunications carrier-B server 14 transmits the fund transfer arrangement information and the random number $R_X$ to the telecommunications carrier-A server 23 identified by the telecommunications carrier $ID_A$ in the form of an e-mail including the merchant's terminal ID as a destination.

At step S284, the telecommunications carrier-A server 23 receives the e-mail including the fund transfer arrangement information and the random number $R_X$ from the telecommunications carrier-B server 14. The process then proceeds to step S285, where the telecommunications carrier-A server 23 transmits the e-mail to the merchant's terminal 21 identified by the merchant's terminal ID via the Internet 22.

At step S306, the merchant's terminal 21 receives the e-mail including the fund transfer arrangement information and the random number $R_X$ from the telecommunications carrier-A server 23. The process then proceeds to step S307, where the merchant's terminal 21 displays the confirmation of the purchase amount M' on the basis of the fund transfer arrangement information.

Either the series of the processes at steps S304, S305, S282, S283, S222, S223, and S204 or the series of the processes at steps S205, S206, S224, S225, S241, S242, S226, S227, S284, S285, S306, and S307 may be executed first. Also, both may be executed at the same time. In other words, the personal terminal 11 can execute the process at step S205 immediately after it executes the process at step S203.

Furthermore, the store personnel may input the purchase amount M' for the goods into the data input and display unit 53 of the merchant's terminal 21. In this case, at step S305, the purchase amount M' is transmitted to the personal terminal 11 together with the random number $R_Y$ generated by the merchant's terminal 21 and is displayed on the data input and display unit 43 of the personal terminal 11. The user X then confirms the purchase amount M'.

The store personnel confirms the purchase amount M' displayed on the merchant's terminal 21 and requests the user X to place the personal terminal 11 above the merchant's terminal 21 again.

In response to the request from the store personnel, the user X places the personal terminal 11 above the NFC communications apparatus 21a of the merchant's terminal 21. At that time, the personal terminal 11 and the merchant's terminal 21 exchange the random numbers $R_X$ and the random number $R_Y$. That is, the merchant's terminal 21, at step S308, transmits the random number $R_X$ to the personal terminal 11 using Near Field Communication while the personal terminal 11, at step S207, receives this random number $R_X$. Also, the personal terminal 11, at step S208, transmits the random number $R_Y$ to the merchant's terminal 21 using Near Field Communication while the merchant's terminal 21, at step S309, receives this random number $R_Y$. Either one of the process at steps S308 and S207 and the process at steps S208 and S309 may be executed first. Alternatively, both the processes may be executed at the same time.

After the process at step S208 is completed, the personal terminal 11, at step S209, compares the random number received from the merchant's terminal 21 by using Near Field Communication (i.e., the random number $R_X$) with the random number $R_X$ generated by itself (the random number generation unit 41) and transmitted to the merchant's terminal 21 via a communication channel other than the Near Field Communication channel. The personal terminal 11 then displays the result of the comparison on the data input and display unit 43.

After the process at step S309 is completed, the merchant's terminal 21, at step S310, compares the random number received from the personal terminal 11 using Near Field Communication (i.e., the random number $R_Y$) with the random number $R_Y$ generated by itself (the random number generation unit 51) and transmitted to the personal terminal 11 via a communication channel other than the Near Field Communication. The merchant's terminal 21 then displays the result of the comparison on the data input and display unit 53.

The user X confirms that these two random numbers $R_X$ are equal, and subsequently, inputs, to the personal terminal 11, an instruction to start a fund transfer of the purchase amount M'.

At step S210, the personal terminal 11 receives the instruction to start a fund transfer of the purchase amount M'. The process then proceeds to step S211, where the personal terminal 11 transmits an e-mail including the instruction to start a fund transfer of the purchase amount M' to the telecommunications carrier-B server 14 via, for example, the telephone network 13.

At step S228, the telecommunications carrier-B server 14 receives the e-mail including the instruction to start a fund transfer of the purchase amount M' from the personal terminal 11. The process then proceeds to step S229, where the telecommunications carrier-B server 14 transmits the e-mail to the bank account-D server 15.

At step S243, the bank account-D server 15 receives the e-mail including the fund transfer instruction from the telecommunications carrier-B server 14. At step S244, in response to the fund transfer instruction, the bank account-D server 15 transfers the purchase amount M' from the account of the user X to the account of the store Y in the bank account-C server 24.

At step S261, the bank account-C server 24 accepts the fund transfer of the purchase amount M' from the bank account-D server 15. The process then proceeds to step S262, where the bank account-C server 24 replenishes the account of the store Y with the purchase amount M' of electronic money.

At step S263, the bank account-C server 24 transmits, to the bank account-D server 15, an e-mail including fund transfer transaction information indicating that the purchase amount M' has been correctly received.

At step S245, the bank account-D server 15 receives the e-mail including the fund transfer transaction information from the bank account-C server 24. The process then proceeds to step S246, where the bank account-D server 15 transmits the e-mail to the telecommunications carrier-B server 14.

At step S230, the telecommunications carrier-B server 14 receives the e-mail including the fund transfer transaction information from the bank account-D server 15. The process then proceeds to step S231, where the telecommunications carrier-B server 14 transmits the e-mail to the personal terminal 11 via, for example, the telephone network 13.

At step S212, the personal terminal 11 receives the e-mail including the fund transfer transaction information from the telecommunications carrier-B server 14. The process then proceeds to step S213, where the personal terminal 11 displays the result of the payment (the result of the fund transfer instruction) of the purchase amount M' of electronic money on the basis of the fund transfer transaction information.

Additionally, after the process at step S263 is completed, the bank account-C server 24, at step S264, transmits an e-mail including replenishment transaction information indicating that it has correctly replenished the account of the store Y with the purchase amount M' to the telecommunications carrier-A server 23.

At step S286, the telecommunications carrier-A server 23 receives the e-mail including the replenishment transaction information from the bank account-C server 24. The process then proceeds to step S287, where the telecommunications carrier-A server 23 transmits that e-mail to the merchant's terminal 21 via the Internet 22.

At step S311, the merchant's terminal 21 receives the e-mail including the replenishment transaction information from the telecommunications carrier-A server 23. The process then proceeds to step S312, where the merchant's terminal 21 displays the balance in the account of the store Y in the bank C on the basis of the replenishment transaction information.

As described above, according to the communications system 1 shown in FIGS. 1 and 2, the personal terminal 11 of the user X transmits an internally generated random number $R_X$ to the merchant's terminal 21 via the telecommunications carrier B to which the user X has subscribed and receives a random number from the merchant's terminal 21 using Near Field Communication. The personal terminal 11 then checks the authenticity of the merchant's terminal 21 (gives authenticity to the merchant's terminal 21) by determining whether the received random number is equal to the random number $R_X$ transmitted to the merchant's terminal 21 via the telecommunications carrier B. Additionally, the merchant's terminal 21 at the store Y transmits an internally generated random number $R_Y$ to the personal terminal 11 via the telecommunications carrier A to which the store Y has subscribed and receives a random number from the personal terminal 11 using Near Field Communication. The merchant's terminal 21 then checks the authenticity of the personal terminal 11 (gives authenticity to the personal terminal 11) by determining whether the received random number is equal to the random number $R_Y$ transmitted to the merchant's terminal 21 via the telecommunications carrier A. Accordingly, the random numbers $R_X$ and $R_Y$ (transmission messages) can be considered to be passwords effective for only one trade.

Accordingly, a card need not store critical information, such as a private key to give authenticity. Furthermore, the need for the card can be eliminated. Even when a card is held by a user and is replaced with a new one, moving the data stored on the card or conversion of electronic money (value) stored on the card to cash is not necessary since critical information and electronic money are not stored on the card. Also, when the user X replaces the personal terminal 11 with a new one, moving the data stored on the personal terminal 11 or conversion of electronic money (value) stored on the personal terminal 11 to cash is not necessary.

Furthermore, according to the communications system 1 shown in FIG. 1, when the user X replenishes his or her own bank account with a replenish amount M of electronic money at the store Y, it is determined whether a sufficient amount (balance) to cover the replenish amount M to be transferred (or to be paid) is available in the account of the store Y in the bank account-C server 24 before transmitting a find transfer instruction that instructs the bank account-C server 24 to transfer the replenish amount M to the bank account-D server 15 having the account of the user X. In addition, when the user X purchases goods costing the purchase amount M' at the store Y, it is determined whether a sufficient amount (balance) to pay the purchase amount M' is available in the account of the user X in the bank account-D server 15 before transmitting a find transfer instruction that instructs the bank account-D server 15 to transfer the purchase amount M' to the bank account-C server 24.

Accordingly, since each of the user X and the store Y can trade while checking the settlement ability (i.e., balance of the account) of the trading partner, safe trade can be made. For example, the store Y can prevent a user having no balance from purchasing goods.

Still furthermore, according to the communications system 1 shown in FIG. 1, since a fund transfer appointment (fund transfer arrangement information) is separated from a fund transfer instruction, refund of a replenish amount M or a purchase amount M' becomes available.

In addition, when electronic money in a bank account is transferred, a terminal notifies (displays) that information to the user. This prevents electronic money in the bank account from being manipulated while the owner of the bank account is unaware.

As described above, according to the communications system 1 shown in FIG. 1, a problem caused by a known card that stores critical information, such as a private key, can be solved.

In the above-described embodiment, if the telecommunications carrier B to which the user X has subscribed is equal to the telecommunications carrier A to which the store Y has subscribed, the need for the communication between the telecommunications carrier B and the telecommunications carrier A can be eliminated. Also, if the bank D (the bank account server 15) having the bank account of the user X is equal to the bank C (the bank account server 24) having the bank account of the store Y, the need for the communication between the banks D and C is eliminated.

Additionally, in the communications system 1 shown in FIG. 1, if, for example, the NFC communications apparatus 21a at the store Y should process a settlement in high speed as in the case where ticket fare is settled with electronic money in an automatic gate at a railway station, the following process can be provided.

That is, before the user X goes through an automatic gate, the user X makes an arrangement of a fund transfer for the desired ticket fare with the store Y and receives an appointment number corresponding to the appointment from the store Y. Subsequently, when the user X goes through the automatic ticket gate (the NFC communications apparatus 21a of the merchant's terminal 21), the personal terminal 11 transmits the arrangement number to the merchant's terminal 21 using Near Field Communication. The merchant's terminal 21 checks the credibility of the information from the received appointment number and transmits a key (exit key) required for the user X to go through an automatic exit ticket gate to the personal terminal 11.

At the automatic exit ticket gate, the personal terminal 11 of the user X transmits the received exit key to the merchant's terminal 21 using Near Field Communication. Upon receiving the exit key, the automatic ticket gate (the merchant's terminal 21) opens the gate to allow the user X to exit. Subsequently, the merchant's terminal 21 computes the actual ticket fare for the user X from information about the exit key and requests the personal terminal 11 to transfer a fund for the ticket fare.

The above-described series of processes can be executed by either dedicated hardware or software. When the above-described series of processes is executed by software, the program forming the software is installed in a recording medium, such as a memory, of an apparatus (terminal).

In the present specification, the steps that describe the program stored on the recording medium include not only processes executed in the above-described sequence, but also processes that may be executed in parallel or independently.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A communications system comprising:
a first communications apparatus; and
a second communications apparatus for communicating with the first communications apparatus;
wherein the first communications apparatus includes generation means for generating a transmission message to be sent to the second communications apparatus and effective for only one transmission, first communications means for directly communicating with the second communications apparatus using Near Field Communication, second communications means for indirectly communicating with the second communications apparatus via a predetermined communication channel, and control means for controlling communication functions of the first and second communications means, and wherein the second communications means transmits the transmission message generated by the generation means to the second communications apparatus via the predetermined communication channel and receives a different transmission message transmitted from the second communications apparatus via the predetermined communication channel, and wherein the first communication means receives a communication message transmitted from the second communications apparatus using Near Field Communication and transmits the different transmission message received by the second communication means to the second communications apparatus using Near Field Communication, and wherein the control means determines whether the communication message received by the first communications means is equal to the transmission message transmitted by the second communications means.

2. A communications apparatus for communicating with a different communications apparatus, comprising:
generation means for generating a transmission message to be sent to the different communications apparatus and effective for only one transmission;
first communications means for directly communicating with the different communications apparatus using Near Field Communication;
second communications means for indirectly communicating with the different communications apparatus via a predetermined communication channel; and
control means for controlling communication functions of the first and second communications means;
wherein the second communications means transmits the transmission message generated by the generation means to the different communications apparatus via the predetermined communication channel and receives a different transmission message transmitted from the different communications apparatus via the predetermined communication channel, and wherein the first communication means receives a communication message transmitted from the different communications apparatus using Near Field Communication and transmits the different transmission message received by the second communication means to the different communications apparatus using Near Field Communication, and wherein the control means determines whether the communication message received by the first communications means is equal to the transmission message transmitted by the second communications means.

3. The communications apparatus according to claim 2, wherein the second communications means indirectly communicates with the different communications apparatus by transmitting and receiving the transmission message and the different transmission message in the form of an e-mail.

4. The communications apparatus according to claim 3, wherein first and second mail servers transfer a received mail to a specified destination, the communications apparatus accesses the first mail server via the predetermined communication channel, and the different communications apparatus accesses the second mail server via the predetermined communication channel, and wherein the first communication means further receives apparatus identification information for identifying the different communications apparatus and server identification information for identifying the second mail server transmitted from the different communications apparatus using Near Field Communication, and wherein the second communications means transmits the transmission message to the different communications apparatus by transmitting the transmission message to the first mail server in the form of an e-mail including the server identification information and the apparatus identification information.

5. The communications apparatus according to claim 2, wherein the generation means generates a random number as the transmission message.

6. The communications apparatus according to claim 2, wherein the communications apparatus includes a mobile communications apparatus.

7. A communications method for use in a communications apparatus for communicating with a different communications apparatus, the communications apparatus including generation means for generating a transmission message to be sent to the different communications apparatus and effective for only one transmission, first communications means for directly communicating with the different communications apparatus using Near Field Communication, second communications means for indirectly communicating with the different communications apparatus via a predetermined communication channel, and control means for controlling communication functions of the first and second communications means, the method comprising the steps of:
transmitting, in the second communications means, the transmission message generated by the generation means to the different communications apparatus via the predetermined communication channel and receiving a different transmission message transmitted from the different communications apparatus via the predetermined communication channel;

receiving, in the first communication means, a communication message transmitted from the different communications apparatus using Near Field Communication and transmitting the different transmission message received by the second communication means to the different communications apparatus using Near Field Communication; and determining, in the control means, whether the communication message received by the first communications means is equal to the transmission message transmitted by the second communications means.

8. A communications system comprising:

a first communications apparatus; and a second communications apparatus configured to communicate with the first communications apparatus;

wherein the first communications apparatus includes a generation unit configured to generate a transmission message to be sent to the second communications apparatus and effective for only one transmission, a first communications unit configured to directly communicate with the second communications apparatus using Near Field Communication, a second communications unit configured to communicate with the second communications apparatus via a predetermined communication channel, and a control unit configured to control communication functions of the first and second communications units, and wherein the second communications unit transmits the transmission message generated by the generation unit via the predetermined communication channel and receives a different transmission message transmitted from the second communications apparatus via the predetermined communication channel, and wherein the first communication unit receives a communication message transmitted from the second communications apparatus using Near Field Communication and transmits the different transmission message received by the second communication unit to the second communications apparatus using Near Field Communication, and wherein the control unit determines whether the communication message received by the first communications unit is equal to the transmission message transmitted by the second communications unit.

9. A communications apparatus for communicating with a different communications apparatus, comprising:

a generation unit configured to generate a transmission message to be sent to the different communications apparatus and effective for only one transmission;

a first communications unit configured to directly communicate with the different communications apparatus using Near Field Communication;

a second communications unit configured to communicate with the different communications apparatus via a predetermined communication channel; and a control unit configured to control communication functions of the first and second communications units;

wherein the second communications unit transmits the transmission message generated by the generation unit via the predetermined communication channel and receives a different transmission message transmitted from the different communications apparatus via the predetermined communication channel, and wherein the first communication unit receives a communication message transmitted from the different communications apparatus using Near Field Communication and transmits the different transmission message received by the second communication unit to the different communications apparatus using Near Field Communication, and wherein the control unit determines whether the communication message received by the first communications unit is equal to the transmission message transmitted by the second communications unit.

* * * * *